(12) United States Patent
Rembert et al.

(10) Patent No.: US 8,560,866 B2
(45) Date of Patent: *Oct. 15, 2013

(54) APPARATUS AND METHOD FOR PROVIDING NETWORK COMMUNICATIONS

(71) Applicant: AT&T Intellectual Property I, LP, Atlanta, GA (US)

(72) Inventors: James Rembert, Atlanta, GA (US); Thomas Arnold Anschutz, Conyers, GA (US); Zhi Cui, Atlanta, GA (US)

(73) Assignee: AT&T Intellectual Property I, LP, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/742,876

(22) Filed: Jan. 16, 2013

(65) Prior Publication Data

US 2013/0136009 A1   May 30, 2013

Related U.S. Application Data

(63) Continuation of application No. 12/581,368, filed on Oct. 19, 2009, now Pat. No. 8,386,812.

(51) Int. Cl.
*G06F 9/46* (2006.01)

(52) U.S. Cl.
USPC ........... 713/300; 713/310; 713/320; 713/321; 713/322; 713/323; 713/324; 713/330; 713/340

(58) Field of Classification Search
USPC ................. 713/300, 310, 320–324, 330, 340
See application file for complete search history.

(56) References Cited

U.S. PATENT DOCUMENTS

| | | | |
|---|---|---|---|
| 7,873,057 B2 | 1/2011 | Robitaille et al. | |
| 8,386,812 B2 * | 2/2013 | Rembert et al. | 713/300 |
| 2006/0239183 A1 | 10/2006 | Robitaille et al. | |
| 2010/0016745 A1 | 1/2010 | Crump et al. | |
| 2011/0080918 A1 | 4/2011 | Robitaille | |

OTHER PUBLICATIONS

"Veracity Outreach PoE-Powered LAN and PoE Repeater", [http//lwww.securityideas.com/veoupolanand.html], 2009, 1 page.

* cited by examiner

*Primary Examiner* — M Elamin
(74) *Attorney, Agent, or Firm* — Guntin & Gust, PLC; Andrew Gust (57) ABSTRACT

A system that incorporates teachings of the present disclosure may include, for example, a Power Over Ethernet (PoE) device (PD) having a controller to receive signals over a first cable having twisted pair wires from at least one of a network element and a gateway where the network element is associated with a service provider where the gateway is associated with a premises and where the service provider provides network communications to the premises, adjust the signals, transmit the adjusted signals over a second cable having twisted pair wires to at least one of the network element and the gateway, and receive power from at least one of the network element and the gateway, where the power is received over at least one of the first and second cables, where the power is received according to PoE protocol, and where the PD is positioned between the network element and the gateway. Other embodiments are disclosed.

20 Claims, 5 Drawing Sheets

APPARATUS AND METHOD FOR PROVIDING NETWORK COMMUNICATIONS

CROSS-REFERENCE TO RELATED APPLICATIONS

This application is a continuation of U.S. patent application Ser. No. 12/581,368 filed Oct. 19, 2009, now U.S. Pat. No. 8,386,812, which is incorporated herein by reference in its entirety.

FIELD OF THE DISCLOSURE

The present disclosure relates generally to communication systems and more specifically to an apparatus and method for providing network communication.

BACKGROUND OF THE DISCLOSURE

Service providers rely upon various types of infrastructure to deliver media services, including voice, video and data, to their users. Optical fibers which transport optical signals and twisted pair lines which transport electrical signals are utilized both independently and in combination with each other to connect premises with service provider networks. The choice of the type of infrastructure to utilize in order to connect a premises can depend upon a number of factors including the type of service and the location of the premises.

DETAILED DESCRIPTION OF THE DRAWINGS

One embodiment of the present disclosure can entail a method including, but not limited to, the steps of receiving first signals from a network element that is associated with a service provider where the first signals are received over a first cable having twisted pair wires, receiving second signals from a gateway that is associated with a premises where the service provider provides network communications to the premises and where the second signals are received over a second cable having twisted pair wires, adjusting the first and second signals at a Power Over Ethernet (PoE) Powered Device (PD) positioned between the network element and the gateway, re-transmitting the adjusted first signals to the gateway over the second cable, re-transmitting the adjusted second signals to the network element over the first cable, and receiving power from the gateway over the second cable, wherein the power is transmitted in compliance with PoE protocol. In this embodiment, the gateway can be the Power Sourcing Equipment (PSE). Multiple cables can be used instead of a single cable to achieve the needed copper pairs.

Another embodiment of the present disclosure can entail a gateway having a controller adapted to transmit first signals to a PD positioned between the gateway and a network element that is associated with a service provider where the first signals are transmitted over a cable having twisted pair wires where the gateway is associated with a premises and where the service provider provides network communications to the premises, transmit power to the PD over the cable, and receive enhanced second signals from the PD over the cable, where the second signals are transmitted from the network element to the PD and enhanced by the PD. In one embodiment, the network equipment can be the PSE.

Yet another embodiment of the present disclosure can entail a PD having a controller to receive signals over a first cable having twisted pair wires from at least one of a network element and a gateway where the network element is associated with a service provider where the gateway is associated with a premises and where the service provider provides network communications to the premises, adjust the signals, transmit the adjusted signals over a second cable having twisted pair wires to at least one of the network element and the gateway (which can be PSEs), and receives power from at least one of the network element and the gateway, where the power is received over at least one of the first and second cables, where the power is received according to PoE protocol, and where the PD is positioned between the network element and the gateway.

Figure 1:
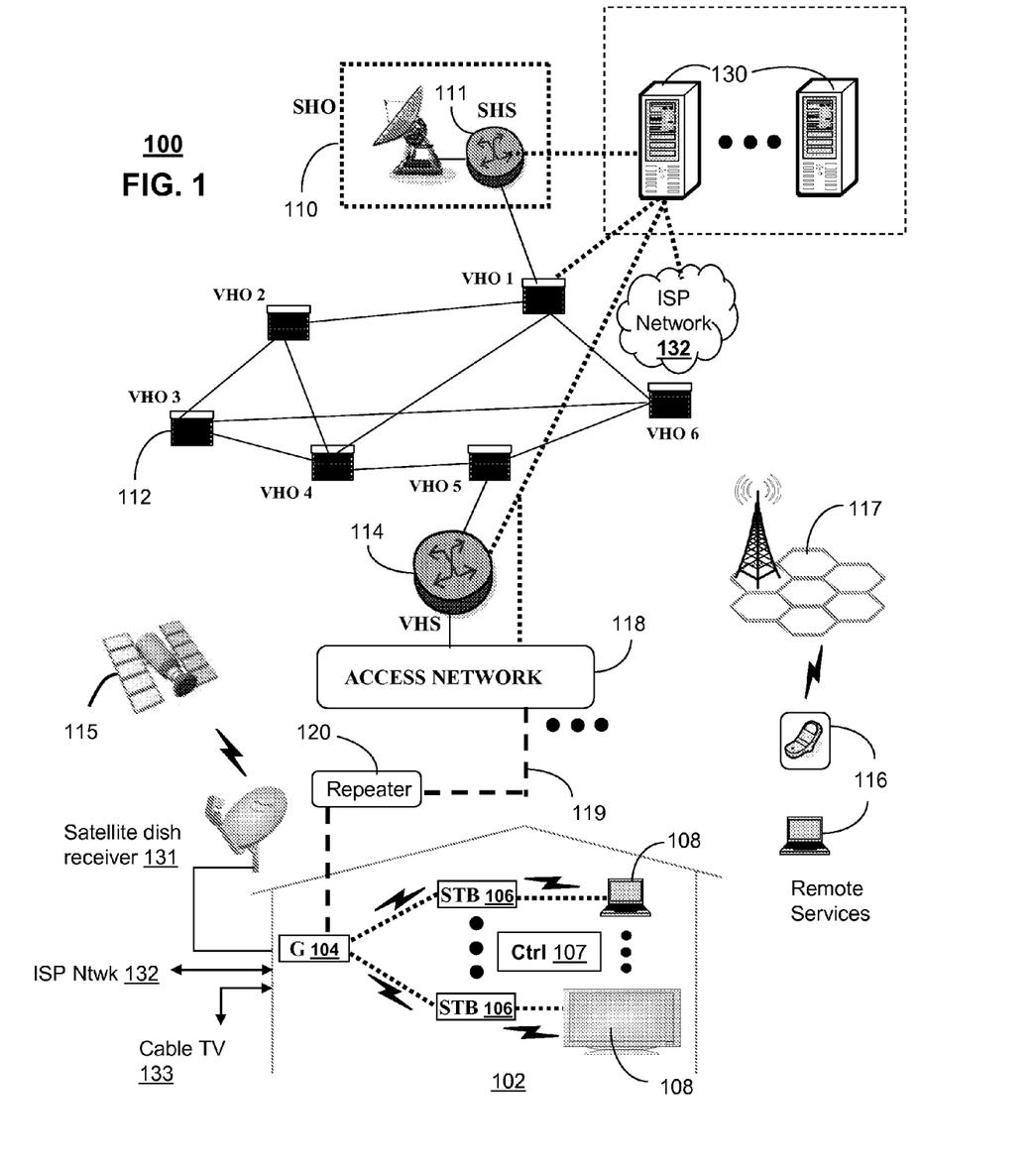
FIG. 1 depicts an illustrative embodiment of a communication system that provides media services.

FIG. 1 depicts an illustrative embodiment of a first communication system 100 for delivering data services including media content. The communication system 100 can represent an Ethernet Service, High Speed Internet, a Internet Protocol Television (IPTV) broadcast media system or other data services. The IPTV media system can include a super head-end office (SHO) 110 with at least one super headend office server (SHS) 111 which receives media content from satellite and/or terrestrial communication systems. In the present context, media content can represent audio content, moving image content such as videos, still image content, or combinations thereof. The SHS server 111 can forward packets associated with the media content to video head-end servers (VHS) 114 via a network of video head-end offices (VHO) 112 according to a common multicast communication protocol.

The VHS 114 can distribute multimedia broadcast programs via an access network 118 to commercial and/or residential buildings 102 housing a gateway 104 (such as a common residential or commercial gateway). The access network 118 can represent a group of access nodes which could include digital subscriber line access multiplexers (DSLAMs) or Optical Line Termination devices (OLTs) located in a central office or a service area interface that provides broadband services over hardwire links 119 to buildings 102. The hardwire links can be of different types, including optical links and copper twisted pairs such as category 5 cables that support 10 Base-T, 100 Base-TX, 1000 Base-T and so forth. System 100 can also utilize an Optical Network Unit (ONU) for delivering data via fiber optics and converting the optical signal to electrical signals for transmission over copper twisted pairs and vice versa. The gateway 104 can be of various types and can include multi-functionality, including one or more of a DSL modem or cable modem, a network switch, LAN switching, a consumer-grade router, and a wireless access point.

In one embodiment, a repeater 120 can be positioned between the premises and the access network to enhance the network communication. The repeater 120 can enhance the signal which allows longer runs of cable from access network elements, such as a pedestal cabinet or Optical Network Unit (ONU), to the premises 102. For instance, optical cables can be run to an ONU under a Fiber-To-The-Curb architecture and residences that are more than 100 m from the ONU can still be connected to the ONU using 100 Base-TX through use of the repeater 120 connected between the ONU and the premises 102. In one embodiment, the repeater 120 can utilize Power-over-Ethernet (PoE) to receive power from the premises 102 and/or the network. For example, the PoE source, or Power Sourcing Equipment (PSE), can be located at the residence 102, such as the gateway 104, which transmits the power over the same cable (having twisted pair copper wires) that transports the data. Other sources are also contemplated, including varying the sources depending upon the recipient of the communications (e.g., determining which gateway of a group of gateway is receiving the communications and requiring that gateway to provide the power to the repeater 120 utilizing the PoE techniques).

In another embodiment, the repeater 120 can be powered by other means or sources that may be independent of the residence 102. In yet another embodiment, the repeater 120 can selectively receive power from multiple sources using multiple techniques. For instance, the repeater 120 can utilize PoE techniques to power up based on the availability of power from a residence 102 but can also rely upon an independent power source when the PoE source is not available. In yet other embodiments, there can be multiple repeaters powered by a single or by multiple sources. In yet other embodiments, repeaters (e.g., switches) may support multiple customers either singly or in a daisy chain. In yet other embodiments, the PoE repeater may use dissimilar technology, (e.g. Ethernet facing the power source, and xDSL in the other direction).

The gateway 104 can use common communication technology to distribute broadcast signals to media processors 106 such as Set-Top Boxes (STBs) which in turn present broadcast channels to media devices 108 such as computers or television sets managed in some instances by a media controller 107 (such as an infrared or RF remote control). The gateway 104, can also distribute data services and signals including Layer 2 Ethernet or Layer 3 IP services. The gateway 104, the media processors 106, and media devices 108 can utilize tethered interface technologies (such as coaxial or phone line wiring) or can operate over a common wireless access protocol. With these interfaces, unicast communications can be invoked between the media processors 106 and subsystems of the IPTV media system for services such as video-on-demand (VoD), browsing an electronic programming guide (EPG), or other infrastructure services. The exemplary embodiment is described with respect to an IPTV system. However, the present disclosure can be used to provide infrastructure to various types of systems including Ethernet-based business and other residential services, such as Internet access as well as Layer-2 VPN.

Some of the network elements of the IPTV media system can be coupled to one or more computing devices 130 a portion of which can operate as a web server for providing portal services over an Internet Service Provider (ISP) network 132 to wireline media devices 108 or wireless communication devices 116 by way of a wireless access base station 117 operating according to common wireless access protocols such as WiFi, or cellular communication technologies (such as GSM, CDMA, UMTS, WiMAX, Software Defined Radio or SDR, and so on).

It will be appreciated by an artisan of ordinary skill in the art that a satellite broadcast television system can be used in place of the IPTV media system. In this embodiment, signals transmitted by a satellite 115 supplying media content can be intercepted by a common satellite dish receiver 131 coupled to the building 102. Modulated signals intercepted by the satellite dish receiver 131 can be submitted to the media processors 106 for generating broadcast channels which can be presented at the media devices 108. The media processors 106 can be equipped with a broadband port to the ISP network 132 to enable infrastructure services such as VoD and EPG described above.

In yet another embodiment, an analog or digital broadcast distribution system such as cable TV system 133 can be used in place of the IPTV media system described above. In this embodiment the cable TV system 133 can provide Internet, telephony, and interactive media services.

It follows from the above illustrations that the present disclosure can apply to any present or future data (e.g., 2 Ethernet, 3 IP/Internet) or interactive media content services.

Figure 2:
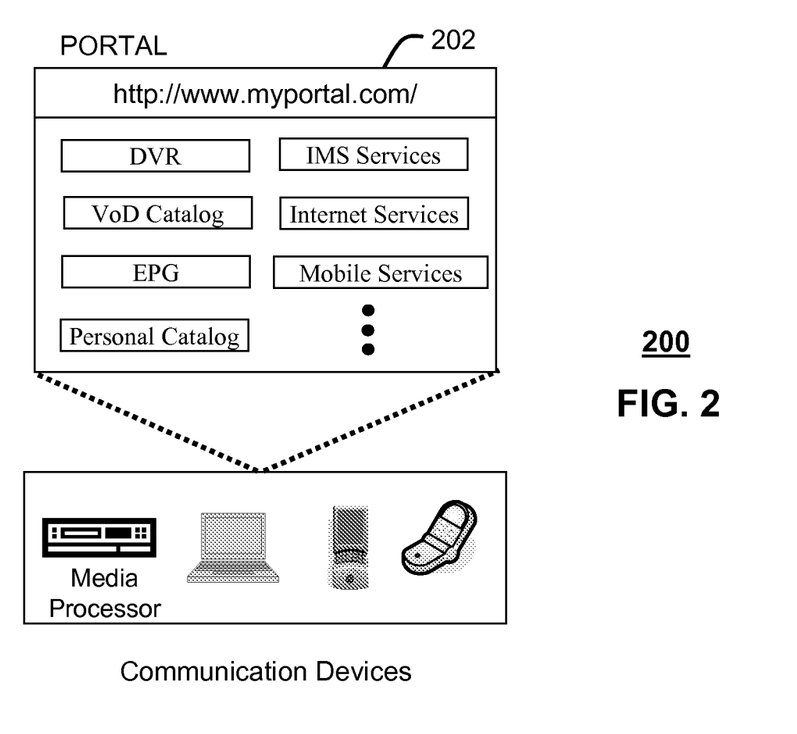
FIG. 2 depicts an illustrative embodiment of a portal interacting with the communication system of FIG. 1.

FIG. 2 depicts an illustrative embodiment of a portal 202 which can operate from the computing devices 130 described earlier of communication system 100 illustrated in FIG. 1. The portal 202 can be used for managing services of communication system 100. The portal 202 can be accessed by a Uniform Resource Locator (URL) with a common Internet browser such as Microsoft's Internet Explorer™ using an Internet-capable communication device such as those described for FIG. 1. The portal 202 can be configured, for example, to access a media processor 106 and services managed thereby such as a Digital Video Recorder (DVR), a VoD catalog, an EPG, a personal catalog (such as personal videos, pictures, audio recordings, etc.) stored in the media processor, provisioning IMS services described earlier, provisioning Internet services, provisioning cellular phone services, and so on.

Figure 3:
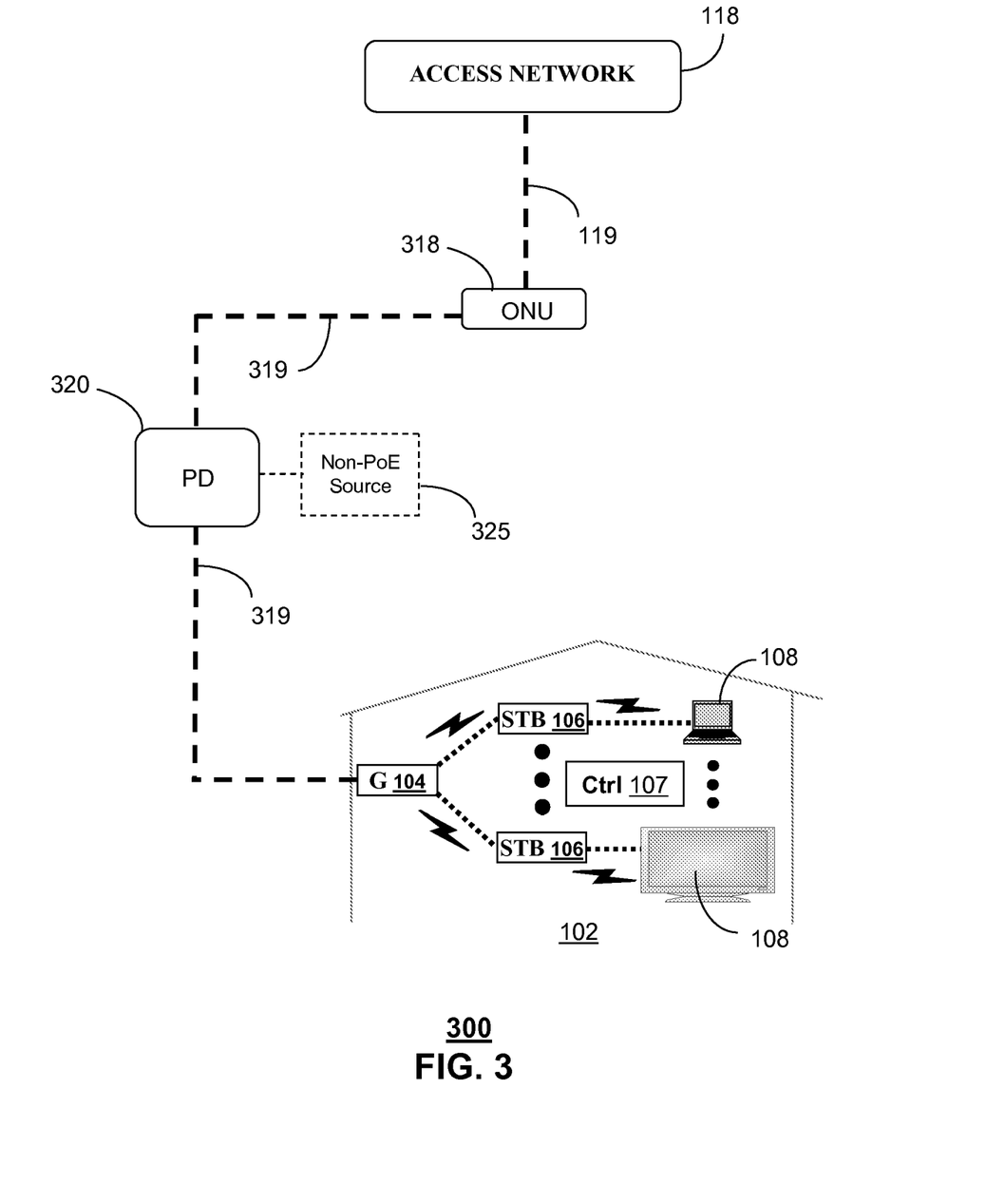
FIG. 3 depicts an illustrative embodiment of a communication system that provides media services.

FIG. 3 depicts an exemplary embodiment of a communication system 300 for providing network communications to a premises 102 including delivering media content. Communication system 300 can be overlaid or operably coupled with communication system 100 as another representative embodiment of said communication system. System 300 can include an access network 118 that exchanges communications with a premises 102 (such as a residence) via network components, such as an ONU 318. In one embodiment, the ONU 318 can be connected to the access network 118 via fiber optic cables, depicted as cables 119. In another embodiment, the ONU 318 can have, or otherwise be connected to, an access network 118 using electrical and/or wireless signal technologies.

The ONU 318 can be connected to one or more premises 102 by way of twisted pair lines 319 or other hardwire links that can transmit the electrical signals representative of the data. In the exemplary embodiment, the lines 319 can be category 5 cables containing four pairs of twisted copper wires, although the present disclosure contemplates the use of other hardwire links. A PD 320 can be positioned along the line 319 between the ONU 318 and the gateway 104. The number and configuration of the PD(s) 320 can vary. For example, each premises 102 can have its own PD 320 along its own line 319. In another example, multiple premises 102 can share one PD 320 such that the PD is connected to each line 319 corresponding to each residence. In yet another example, a single premises 102 can use multiple, cascaded PDs 320 in a way to further extend the reach of Ethernet signals to other premises.

The PD 320 can include a repeater to enhance the signals that are being exchanged between the service provider network (via ONU 318) and the gateway 104. In one embodiment, the PD 320 can be a hardware component that functions as a multi-port active Ethernet hub (e.g., a two-port active Ethernet hub). The module can be various types of a repeater/ hub or a switch The PD 320 can include Ethernet chipsets and PoE circuit components so that the module can receive and retransmit signals (such as an active hub) from either or both of the ONU 318 and the gateway 104, while also receiving power via PoE techniques from a PSE. In one embodiment, the module can have three or more ports and can be an Ethernet switch.

In one embodiment, the PSE for the PD 320 can be customer premises equipment, such as gateway 104 of residence 102, although other components can also be utilized including endspan PSEs, like an Ethernet switch of the residence, or midspan PSEs, like a discrete power injection device or adapter. For example, the gateway 104 can provide power to the PD 320 utilizing two of the four pairs of twisted copper wires of line 319 where the line utilized is a category 5 cable. In one embodiment, the PoE techniques or protocol can be performed according to the IEEE 802.3af and/or IEEE 802.3at Standard (the disclosure of which is hereby incorporated by reference), although other techniques, protocols and/or standards could also be utilized. For example, the gateway 104 can output 15.40 W of power directed to the PD 320 along the twisted pair lines, but other amounts are also contemplated.

System 300 can also include other power sources for the PD 320. In one embodiment, the PSE for module 320 can be the ONU 318. For example, either or both of the ONU 318 and the gateway 104 can supply power over the lines 319. The power source can be selected based on a number of factors. For instance, the power supply being received from the gateway 104 can be monitored for undesired conditions, such as fluctuations and so forth, and based on a detected undesired condition, the PoE power source can be switched from the gateway 104 to the ONU 318. The undesired condition can be monitored by the PD 320, the gateway 104 and/or other network elements, including the ONU 318. In another embodiment, the PD 320 can be receiving power from both the gateway 104 and the ONU 318, simultaneously to support normal operation, and can also operate in a reduced capacity using a single source.

In yet another embodiment, a separate Non-PoE power source 325 can be utilized. For example, the PD 320 can be connected to a power grid, premises utility line or another power source, such as a solar cell, battery, and so forth, to supply power to the module as necessary. For instance, the power being supplied via the PoE techniques from either or both of the gateway 104 and the ONU 318 can be monitored for undesired conditions and upon detection of such a condition, the PD 320 can then retrieve its power directly from power source 325, including without the need to utilize PoE techniques.

System 300 can also utilize various protocols, techniques and combinations thereof for exchanging signals, including voice, video and audio content, with the gateway 104, including hardwire links and wireless communication such as WiFi, WiMax, GPRS, 3G, 4G and so forth. System 300 can also utilize various protocols, techniques and combinations thereof for transmitting the signals to various points throughout the system, including use of an IPTV access network, the public Internet, and/or an IMS network.

Figure 4:
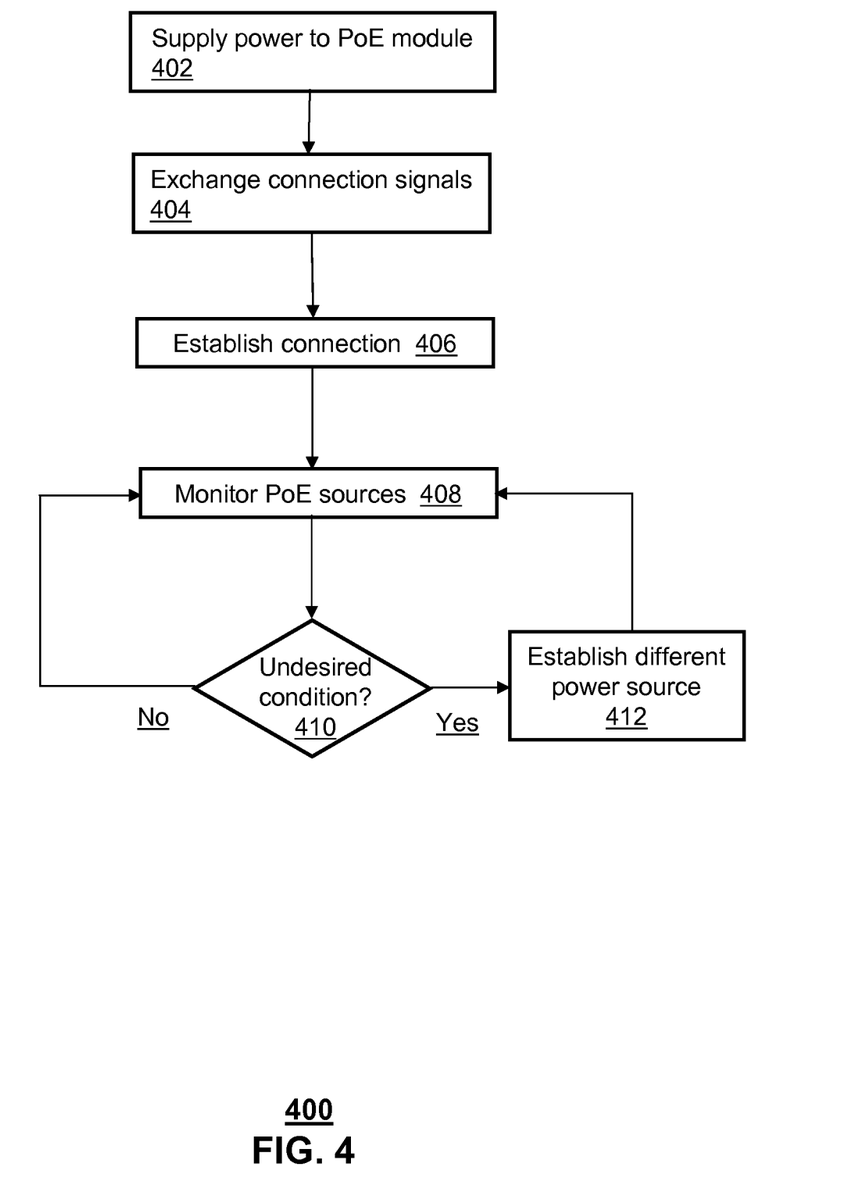
FIG. 4 depicts an illustrative embodiment of a method operating in portions of the communication systems of FIGS. 1 and 3.

FIG. 4 depicts an illustrative method 400 operating in portions of communication systems 100 and 300. Method 400 can begin with step 402 in which power is supplied to the PD 320 so that Ethernet link can be established between the PD 320 and the access network ONU 318 and the PD 320 and the premises GW 104. Then the signals being exchanged between the gateway 104 and the service provider network can be enhanced (such as through receipt and re-transmission of the signals by the repeater). In step 404, the gateway 104 and service provider network can exchange signals in order to establish a connection therebetween (e.g., using VLANs, PPPoE or DHCP). Based on the exchange of signals, the gateways 105 can establish a connection with the service provider in step 406.

In step 408, power sources associated with the PD 320 can be monitored. For example, the PD 320 can be receiving its power from the gateway 104 using PoE techniques. The PD 320, the gateway 104 and/or the service provider (e.g., using a monitoring device in the ONU 318) can monitor the power that is being supplied to the module. In step 410, a determination can be made as to whether an undesired condition exists with respect to the supplying of power to the PD 320. The undesired condition can be determined based on a number of factors including power fluctuations, available resources, cost, and so forth.

If an undesired condition does not exist then the PD 320 can continue to receive its power from the same source (e.g., one or more of the PD 320, the gateway 104 and/or the ONU 318). However, if an undesired condition is detected then a different power source can be established for the PD 320 in step 412. The new power source can provide power to the PD 320 using PoE techniques (such as the power source being switched from the gateway 104 to the ONU 318), however, the power source can also directly provide power to the PD, such as through a residential power line and so forth. Once the test for an undesired condition is completed and a desired outcome is achieved, the process can once again monitor PoE sources in step 408.

The monitoring of the power being supplied to the PD 320 allows the PD to adjust to conditions occurring in the network (including in the premises 102) and retrieve power from an appropriate source(s). The monitoring can be done by any number of devices, while the adjusting of the power source for the PD can be performed by any number of other devices. For instance, the gateway 104 can monitor its own ability to provide power to the PD 320 and upon detection of an undesired condition, the gateway can communicate control signals to the PD so that the power source is changed.

The implementation of the change of power source can be performed at the PD 320 and/or at the new power source. For example, the PD 320 can detect the need to change power sources and can transmit a control signal to the ONU 318 so that the ONU begins to supply power to the PD. Similarly, the previous power supply (e.g., the gateway 104) can transmit a control signal to the new power source (e.g., the ONU 318 or another gateway associated with a different premises) to change the power source. In one embodiment, polling can be performed to determine available power sources, such as gateways or network elements that are capable of supplying power to the PD 320. In another embodiment, available power sources can be stored in memory, such as in a database that is accessible by the device that determines and/or implements the change of power source.

In one embodiment, historical information can be utilized for adjusting the power source for the PD 320. For example, increased power demand for a premises at certain time of the day can be tracked and added to the historical information so that the PD can derive some or all of its power from a source other than the premises 102.

Upon reviewing the aforementioned embodiments, it would be evident to an artisan with ordinary skill in the art that said embodiments can be modified, reduced, or enhanced without departing from the scope and spirit of the claims described below. For example, the PoE techniques can be extended to provide power to one or more devices in the premises 102 in the event of a power outage. For example, when a power outage occurs at a residence then the PD 320 can retrieve its power directly from a power source (such as the power grid) or from the service provider (e.g., ONU 318) via PoE techniques. The PD 320 can supply power to the gateway 104 and one or more user devices (such as a WiFi Access Point or VoIP communication device) using the PoE techniques so that the user can still communicate even in the absence of power at the premises 102.

In one embodiment, the power source for the PD 320 can be selected from a group of gateways 104 that are each associated with a different premises 102 being served by the ONU 318 and the PD. In this example, the premises associated with the session can be used to provide power to the PD 320. In the event of an undesired condition, the power source can be switched to another of the gateways 104 even if not associated with the particular session. For instance, the service provider can track the amount of power being supplied by a first gateway 104 and utilized for communications associated with a second gateway so that the premises associated with the second gateway can pay the cost.

In another embodiment, the system 300 can adjust the power source for the PD 320 to reduce or otherwise compensate for noise associated with the exchange of data. For example, the PD 320, the gateway 104 and/or the service provider (e.g., using a monitoring device in the ONU 318) can monitor for an undesired condition or noise associated with data exchange including packet loss, jitter, and so forth. Based on the amount of noise exceeding a threshold, the power source can be changed in an effort to reduce the noise, such as changing the power source from the gateway 104 that is exchanging data with the service provider to another gateway or the ONU 318.

The enhancement of the signals by the PD 320 (e.g., the repeater device) can include re-transmitting the signals after amplifying, reshaping, regenerating, and/or repeating. The enhancement can also include filtering, adjusting error correction and so forth. In one embodiment, the PD 320 can adjust the signals, in either or both directions, to compensate for mismatched transmission rates.

The exemplary embodiments describe enhancement of the electric signals in both directions (i.e., from the gateway 104 to the service provider network as well as from the service provider network to the gateway). However, the present disclosure also contemplates providing the enhancement in only one direction or varying the amount of enhancement between the upstream and downstream directions.

The exemplary embodiment can be implemented using outside plant PDs (e.g., environmentally packaged so that they can be buried with a drop or tensioned along an aerial drop). In one embodiment, a PoE repeater can be used to provide broadband service as a service architecture. In another embodiment, the methodology can include summing power from multiple inputs and performing intelligent changes in operation depending on power source direction and quality (and signals). In yet another embodiment, a hybrid PD can be implemented that utilizes PoE to energize a xDSL modem or a copper-fiber media converter at the ONU.

Other suitable modifications can be applied to the present disclosure without departing from the scope of the claims below. Accordingly, the reader is directed to the claims section for a fuller understanding of the breadth and scope of the present disclosure.

The exemplary embodiments can be implemented using a number of different hardware components and software. For instance, analog and digital logic gates could be utilized to implement an active hub powered with PoE that performs one or more of the functions described with respect to the exemplary embodiments. However, other components and methodologies can also be utilized to implement the techniques of the exemplary embodiments including an embedded processor.

Figure 5:
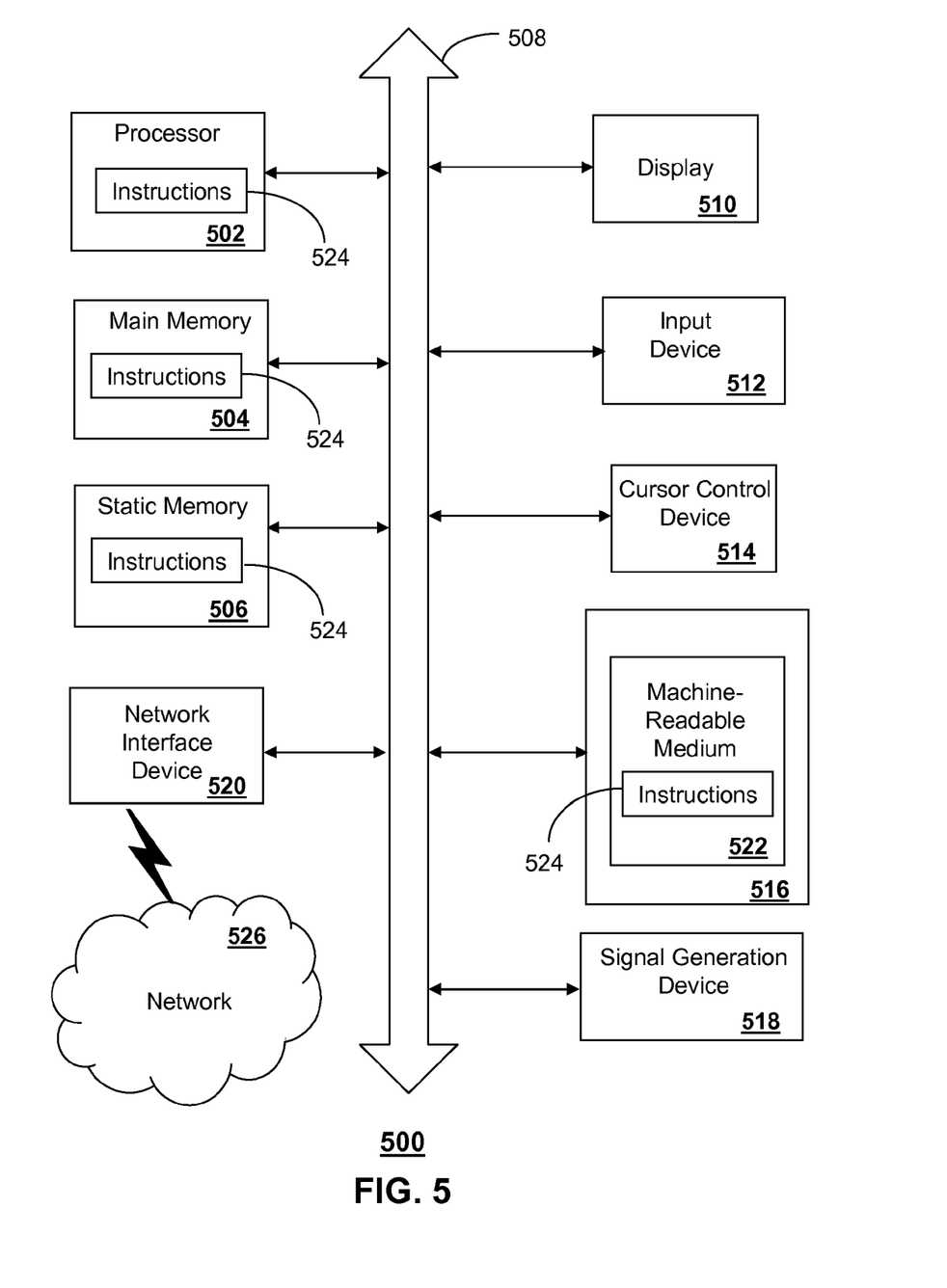
FIG. 5 is a diagrammatic representation of a machine in the form of a computer system within which a set of instructions, when executed, may cause the machine to perform any one or more of the methodologies discussed herein.

FIG. 5 depicts an exemplary diagrammatic representation of a machine in the form of a computer system 500 within which a set of instructions, when executed, may cause the machine to perform any one or more of the methodologies discussed above. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a laptop computer, a desktop computer, a control system, a System-on-a-Chip (SoC), a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 500 may include a processor 502 [e.g., a central processing unit (CPU), a graphics processing unit (GPU), or both], a main memory 504, a static memory 506, and a common communications bus 508. The computer system 500 may further include a display unit 510 (e.g., a lamp indicator, liquid crystal display (LCD), a flat panel, a solid state display, or a cathode ray tube (CRT)). The computer system 500 may include an input device 512 (e.g., a button or keyboard), a cursor control device 514 (e.g., a mouse or touchscreen), a disk drive unit 516, a signal generation device 518 (e.g., a speaker or remote control) and a network interface device 520.

The disk drive unit 516 may include a machine-readable medium 522 on which is stored one or more sets of instructions (e.g., software 524) embodying any one or more of the methodologies or functions described herein, including those methods illustrated above. The instructions 524 may also reside, completely or at least partially, within the main memory 504, the static memory 506, and/or within the processor 502 during execution thereof by the computer system 500. The main memory 504 and the processor 502 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 524, or that which receives and executes instructions 524 from a propagated signal so that a device connected to a network environment 526 can send or receive voice, video or data, and to communicate over the network 526 using the instructions 524. The instructions 524 may further be transmitted or received over a network 526 via the network interface device 520.

While the machine-readable medium 522 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure.

The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and/or a digital file attachment to e-mail or other self-contained information archive or set of archives is considered a distribution medium equivalent to a tangible storage medium. Accordingly, the disclosure is considered to include any one or more of a machine-readable medium or a distribution medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. .sctn.1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method comprising:
receiving, by a processor, first signals from a network element that is associated with service provider equipment, the first signals being received over a first cable having twisted pair wires;
receiving, by the processor, second signals from a gateway that is associated with a premises, the service provider equipment providing network communications to the premises, the second signals being received over a second cable having twisted pair wires;
adjusting, by the processor, the first and second signals at a power over ethernet device positioned between the network element and the gateway;
re-transmitting, by the processor, the adjusted first signals to the gateway over the second cable;
re-transmitting, by the processor, the adjusted second signals to the network element over the first cable;
receiving, by the processor, power from at least one of the network element over the first cable and the gateway over the second cable, wherein the power is transmitted in compliance with a power over ethernet protocol, and wherein the received power is monitored for power parameters and adjusted based on the power parameters;
determining, by the processor an undesired condition associated with a receipt of power by the power over ethernet device based on historical information associated with at least one of the gateway or the network element, wherein a power source for the power over ethernet device is switched based on the historical information;
monitoring, by the processor, power received at the power over ethernet device for power parameters; and
energizing, by the processor, one of a digital subscriber line modem or a copper-fiber media converter at an optical network unit using the power over ethernet device.

2. The method of claim 1, comprising adjusting the first and second signals using amplification, wherein the processor is incorporated into the power over ethernet device.

3. The method of claim 1, wherein the adjusting further comprises adjusting the first and second signals using re-shaping.

4. The method of claim 1, wherein the adjusting further comprises adjusting the first and second signals using one of regenerating or repeating.

5. The method of claim 1, wherein the power source is switched to a non-power over ethernet source based on the monitored power parameters.

6. The method of claim 1, wherein the first and second signals are ethernet signals and the adjusting of the first and second signals is by repeating.

7. A gateway comprising:
a memory storing computer instructions; and
a controller coupled to the memory, wherein executing the computer instructions cause the controller to perform operations comprising:
transmitting first signals to a power over ethernet device positioned between the gateway and a network element that is associated with a service provider, the first signals being transmitted over a cable having twisted pair wires, the gateway being associated with a premises, the service provider providing network communications to the premises;
transmitting power to the power over ethernet device over the cable;
receiving enhanced second signals from the power over ethernet device over the cable, the second signals being transmitted from the network element to the power over ethernet device and enhanced by the power over ethernet device;
wherein an undesired condition associated with a receipt of power by the power over ethernet device is determined based on historical information associated with at least one of the gateway or the network element, wherein a power source for the power over ethernet device is switched based on the historical information, wherein power received at the power over ethernet device is monitored for power parameters; and
transmitting a power control signal to the power over ethernet device.

8. The gateway of claim 7, wherein power received at the power over ethernet device is adjusted based on the power parameters.

9. The gateway of claim 7, wherein the second signals are enhanced by one of amplification, re-shaping, regenerating or repeating.

10. The gateway of claim 7, wherein the power control signal causes the power over ethernet device to retrieve power from the power source instead of the gateway.

11. The gateway of claim 10, wherein the power source is one of the network element or a non-power over ethernet source.

12. The gateway of claim 7, wherein the operations further comprise monitoring for the undesired condition associated with supplying power to the power over ethernet device.

13. The gateway of claim 7, wherein the power over ethernet device is supplied power by the gateway or the network element according to a power over ethernet protocol.

14. A power over ethernet device comprising:
a memory storing computer instructions;
a controller coupled to the memory, wherein executing the computer instructions cause the controller to perform operations comprising:
receiving signals over a first cable having twisted pair wires from at least one of a network element and a gateway, the network element being associated with a service provider, the gateway being associated with a premises, the service provider providing network communications to the premises;
adjusting the signals;
transmitting the adjusted signals over a second cable having twisted pair wires to at least one of the network element and the gateway;
receiving power from at least one of the network element and the gateway, wherein the power is received over at least one of the first and second cables,
wherein the power is received according to power over ethernet protocol, wherein the power over ethernet device is positioned between the network element and the gateway, wherein the received power is monitored for power parameters and adjusted based on the power parameters, wherein an undesired condition associated with a receipt of power by the power over ethernet device is determined based on historical information associated with at least one of the gateway or the network element, and wherein a power source for the power over ethernet device is switched based on the historical information;
monitoring power received at the power over ethernet device for power parameters; and
energizing one of a digital subscriber line modem or a copper-fiber media converter at an optical network unit using the power over ethernet device.

15. The power over ethernet device of claim 14, wherein the adjusting further comprises adjusting the signals by amplification.

16. The power over ethernet device of claim 14, wherein the adjusting further comprises adjusting the signals by one of re-shaping, regenerating or repeating.

17. The power over ethernet device of claim 14, wherein the operations further comprise receiving power from the power source, wherein the power source comprises a non-power over ethernet source.

18. The power over ethernet device of claim 14, wherein the operations further comprise receiving a power control signal from the gateway, wherein the power control signal causes the power over ethernet device to switch to a different power source.

19. The power over ethernet device of claim 14, wherein the operations further comprise receiving a power control signal from the network element, wherein the power control signal causes the power over ethernet device to switch to a different power source.

20. The power over ethernet device of claim 14, wherein the operations further comprise transmitting enhanced second signals to a group of gateways that includes the gateway.

* * * * *